US010915638B2

(12) United States Patent
Czaplewski et al.

(10) Patent No.: US 10,915,638 B2
(45) Date of Patent: Feb. 9, 2021

(54) ELECTRONIC SECURITY EVALUATOR

(71) Applicant: TARGET BRANDS, INC., Minneapolis, MN (US)

(72) Inventors: Jennifer Czaplewski, Eden Prairie, MN (US); Jay Lindquist, New Brighton, MN (US); Catilina Self, Minnetonka, MN (US); Jodie Kautt, North Oaks, MN (US); Richard Agostino, Maple Grove, MN (US)

(73) Assignee: Target Brands Inc., Minneapolis, MN (US)

( * ) Notice: Subject to any disclaimer, the term of this patent is extended or adjusted under 35 U.S.C. 154(b) by 152 days.

(21) Appl. No.: 15/981,410

(22) Filed: May 16, 2018

(65) Prior Publication Data

US 2019/0354686 A1 Nov. 21, 2019

(51) Int. Cl.
*G06F 21/57* (2013.01)
*G06F 16/28* (2019.01)
*G06F 16/23* (2019.01)

(52) U.S. Cl.
CPC ........ *G06F 21/577* (2013.01); *G06F 16/2379* (2019.01); *G06F 16/287* (2019.01); *G06F 2221/033* (2013.01)

(58) Field of Classification Search
CPC .. G06F 21/577; G06F 16/2379; G06F 16/287; G06F 2221/033
See application file for complete search history.

(56) References Cited

U.S. PATENT DOCUMENTS

| 7,359,865 | B1 * | 4/2008 | Connor .................. G06Q 40/08 705/7.28 |
| 7,380,270 | B2 | 5/2008 | Tracy et al. |
| 7,487,545 | B2 | 2/2009 | Hall et al. |
| 8,156,558 | B2 * | 4/2012 | Goldfeder ............. G06F 21/566 713/188 |
| 8,375,427 | B2 | 2/2013 | Alavandar et al. |
| 8,499,353 | B2 * | 7/2013 | Lockhart ............. G06F 11/3612 726/22 |

(Continued)

OTHER PUBLICATIONS

Search Query Report from IP.com (performed May 8, 2020).*
Search Query Report from IP.com (performed Oct. 19, 2020) (Year: 2020).*

*Primary Examiner* — Sharon S Lynch
(74) *Attorney, Agent, or Firm* — Hamre, Schumann, Mueller & Larson, P.C.

(57) ABSTRACT

A computer-implemented method includes retrieving, by a server, application data about the one or more software applications via one or more databases. The server retrieves security data for the one or more software applications via the one or more databases. The server calculates a plurality of categorical scores for each of the one or more software applications based on the security data. The server calculates an overall security score for each of the one or more software applications based on the plurality of categorical scores as calculated. The server instructs the plurality of categorical scores and the overall security score for each of the one or more software applications to be stored in an application database. The server outputs to a user device the plurality of categorical scores and the overall security score for each of the one or more software applications in the application database.

16 Claims, 10 Drawing Sheets

(56) References Cited

U.S. PATENT DOCUMENTS

| | | | |
|---|---|---|---|
| 8,701,198 B2 | 4/2014 | Greene et al. | |
| 9,069,967 B2 | 6/2015 | Wysopal et al. | |
| 9,215,548 B2* | 12/2015 | Belani | H04W 12/02 |
| 9,264,444 B2 | 2/2016 | Moore et al. | |
| 9,268,946 B2* | 2/2016 | Bettini | G06F 21/57 |
| 9,270,694 B2 | 2/2016 | Loder et al. | |
| 9,323,935 B2 | 4/2016 | Condry et al. | |
| 9,407,443 B2* | 8/2016 | Wyatt | G06F 8/70 |
| 9,467,465 B2 | 10/2016 | Hibbert et al. | |
| 9,501,647 B2* | 11/2016 | Yampolskiy | H04L 61/1511 |
| 10,171,510 B2* | 1/2019 | O'Reilly | G06F 21/577 |
| 10,313,383 B2* | 6/2019 | Sommer | G06Q 20/4016 |
| 10,491,619 B2* | 11/2019 | Yampolskiy | H04L 61/2007 |
| 2002/0116627 A1* | 8/2002 | Tarbotton | G06F 21/121 726/22 |
| 2004/0230835 A1* | 11/2004 | Goldfeder | G06F 21/566 726/23 |
| 2005/0132225 A1 | 6/2005 | Gearhart | |
| 2008/0209567 A1* | 8/2008 | Lockhart | G06F 21/577 726/25 |
| 2009/0024663 A1 | 1/2009 | McGovern | |
| 2009/0077666 A1* | 3/2009 | Chen | G06Q 10/0631 726/25 |
| 2011/0093955 A1* | 4/2011 | Chen | G06F 21/577 726/25 |
| 2011/0173693 A1* | 7/2011 | Wysopal | G06F 21/577 726/19 |
| 2011/0265162 A1* | 10/2011 | Alavandar | G06F 21/577 726/7 |
| 2011/0289582 A1* | 11/2011 | Kejriwal | G06F 21/566 726/22 |
| 2012/0072991 A1* | 3/2012 | Belani | H04W 4/50 726/25 |
| 2013/0019315 A1* | 1/2013 | Chen | G06F 21/577 726/25 |
| 2013/0212684 A1* | 8/2013 | Li | G06F 16/22 726/25 |
| 2013/0326476 A1* | 12/2013 | Wyatt | H04L 43/04 717/120 |
| 2014/0344008 A1* | 11/2014 | Gammage | G06Q 10/0635 705/7.28 |
| 2015/0150137 A1* | 5/2015 | Bettini | G06F 21/566 726/25 |
| 2015/0180875 A1* | 6/2015 | Kay | G06F 21/629 726/4 |
| 2015/0229664 A1* | 8/2015 | Hawthorn | H04L 63/1433 726/25 |
| 2015/0319185 A1* | 11/2015 | Kirti | H04L 67/306 726/23 |
| 2016/0070704 A1* | 3/2016 | Yu | G06F 16/907 707/723 |
| 2016/0119373 A1 | 4/2016 | Fausto et al. | |
| 2016/0162269 A1* | 6/2016 | Pogorelik | G06F 21/57 726/25 |
| 2016/0248797 A1* | 8/2016 | Yampolskiy | G06Q 10/06393 |
| 2017/0048267 A1* | 2/2017 | Yampolskiy | G06F 21/57 |
| 2017/0213037 A1 | 6/2017 | Toledano et al. | |
| 2017/0200006 A1* | 7/2017 | Gershoni | G06Q 10/06 |
| 2017/0201545 A1 | 7/2017 | Nicodemus et al. | |
| 2017/0213038 A1* | 7/2017 | Shabtai | G06Q 10/0635 |
| 2017/0244746 A1* | 8/2017 | Hawthorn | H04L 63/1408 |
| 2019/0114435 A1* | 4/2019 | Bhalla | G06F 21/577 |
| 2019/0273726 A1* | 9/2019 | Shumsker | H04W 4/21 |
| 2020/0210326 A1* | 7/2020 | Dotson | G06F 11/0751 |
| 2020/0252415 A1* | 8/2020 | Hamdi | G06F 11/3428 |
| 2020/0285756 A1* | 9/2020 | Bhalla | G06F 21/577 |
| 2020/0285757 A1* | 9/2020 | Bhalla | G06F 21/577 |

\* cited by examiner

Risk Accepted Findings

| Name | Risk | Planned Close Date | ID | Description | Status | Open Date | Owner | Source |
|---|---|---|---|---|---|---|---|---|
| App A | Low | NA | 9012 | App A exposes an internal server to the external network | Accepted | 2017-12-12 | John Doe | Src 1 |

336

Application Summary

| Application | Risk | Status | Security Test | Last Security Test |
|---|---|---|---|---|
| App A | Low | Complete | Complete | 1 Jan 2018 |
| App B | High | Complete | Incomplete | None |

ELECTRONIC SECURITY EVALUATOR

FIELD

This disclosure relates generally to electronic information technology security evaluation and improvement. More specifically, the disclosure relates to an electronic security evaluator and graphical user interfaces for electronically evaluating and improving security for one or more software applications and associated hardware within an organization such as, but not limited to, a retail organization (e.g., a retailer).

BACKGROUND

Organizations, such as retail organizations (e.g., a retailer), rely upon a number of different software applications to serve their customers. These software applications may be targets of attempts to attack the users' computer systems and to steal sensitive data from the users or otherwise disrupt business operations of the organizations.

Improved ways of monitoring and improving security of the software applications to prevent such stealing and attacks are desirable.

SUMMARY

This disclosure relates generally to electronic information technology security evaluation and improvement. More specifically, the disclosure relates to an electronic security evaluator and graphical user interfaces for electronically evaluating and improving security for one or more software applications and associated hardware within an organization such as, but not limited to, a retail organization (e.g., a retailer).

A computer-implemented method to determine a security evaluation for one or more software applications in an organization is disclosed. The method includes retrieving, by a server, application data about the one or more software applications via one or more databases. The server retrieves security data for the one or more software applications via the one or more databases. The server calculates a plurality of categorical scores for each of the one or more software applications based on the security data. The server calculates an overall security score for each of the one or more software applications based on the plurality of categorical scores as calculated. The server instructs the plurality of categorical scores and the overall security score for each of the one or more software applications to be stored in an application database. The server outputs to a user device the plurality of categorical scores and the overall security score for each of the one or more software applications in the application database.

An electronic security evaluation system is also disclosed. The system includes a server. The server includes an electronic security evaluator that retrieves data about one or more software applications via one or more databases. The server retrieves security data for the one or more software applications via the one or more databases. The server calculates a plurality of categorical scores for each of the one or more software applications. The server calculates an overall security score for each of the one or more software applications. The server outputs the plurality of categorical scores and the overall security score for each of the one or more software applications. The server stores the plurality of categorical scores and the overall security score for each of the one or more software applications in an application database. The server provides instructions to a user device over a network to cause display of a graphical user interface (GUI) on the display, the GUI including display of the plurality of categorical scores and the overall security score for one or more of the one or more software applications.

An electronic security evaluator interface for a computer device is also disclosed. The computer device includes one or more processors and one or more non-transitory tangible computer-readable media programmed with program instructions which, when the program instructions are executed, causes the computer device to display an electronic security evaluator interface. The electronic security evaluator interface includes inputs for completion by a user. The inputs identify one or more software applications in an organization for which to display the electronic security evaluator interface. The electronic security evaluator interface includes an overall security score and a plurality of categorical security scores for a selected one of the one or more software applications in the organization. When the inputs are received from the computer device identifying one of the one or more software applications, the electronic security evaluator interface is automatically updated and displays the overall security score and the plurality of categorical security scores for the selected one of the one or more software applications in the organization according to the inputs received.

In an embodiment, recommendations for ways to improve the overall security score can be shown. The recommendations can include specific and prioritized ways that a user can improve the overall security score of the software application, including an indication of how much the overall security score would improve if the user takes the corresponding action.

In an embodiment, the server can retrieve information about the one or more software applications and security information for the one or more software applications via one or more databases or one or more application programming interfaces (APIs).

BRIEF DESCRIPTION OF THE DRAWINGS

References are made to the accompanying drawings that form a part of this disclosure and which illustrate embodiments in which the systems and methods described in this specification can be practiced.

FIG. 4B is a schematic diagram of a second portion of the GUI of FIG. 4A for the electronic security evaluator showing a group of software applications, according to an embodiment.

Like reference numbers represent like parts throughout.

DETAILED DESCRIPTION

Figure 1:
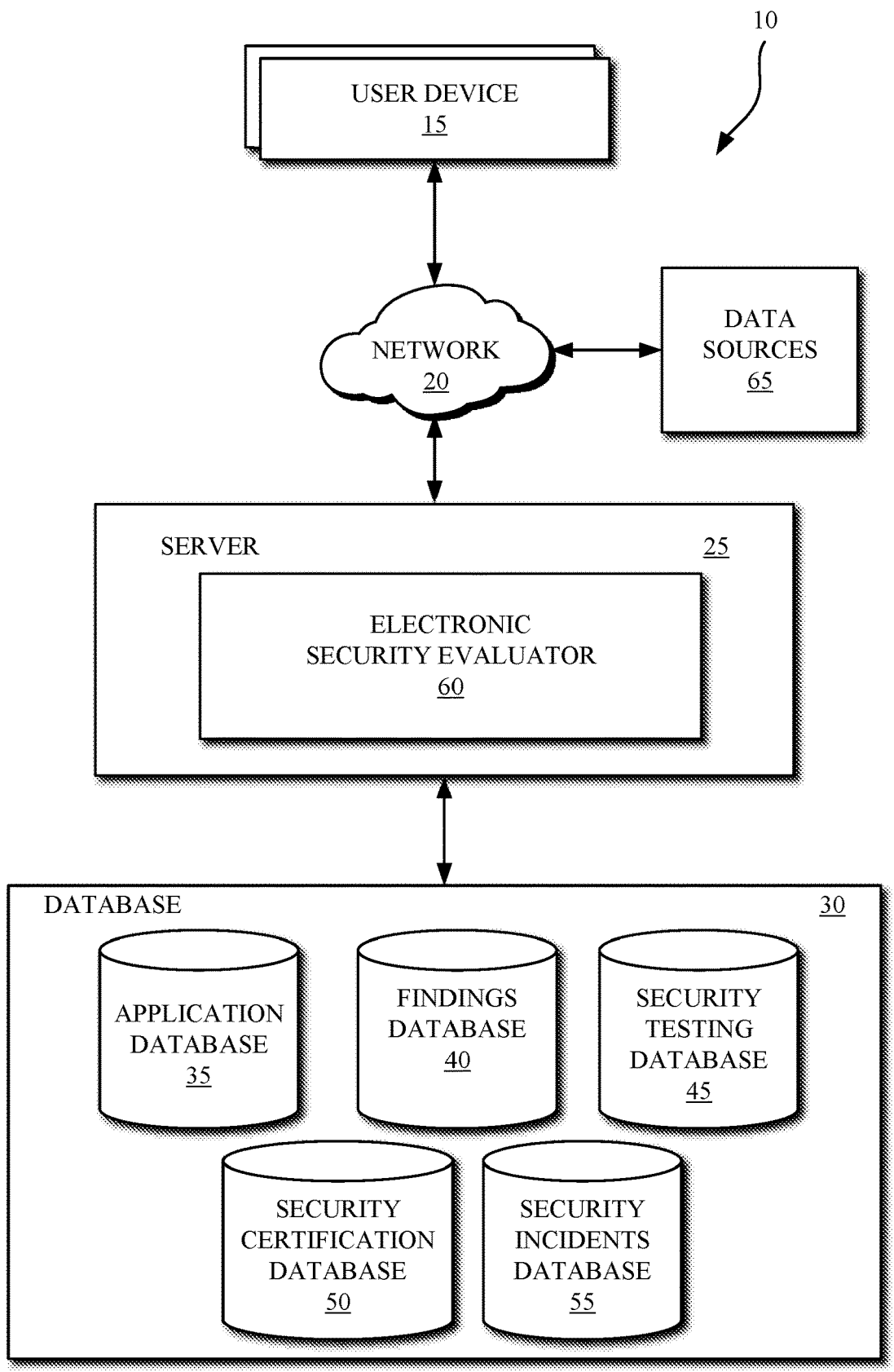
FIG. 1 is a schematic diagram of a system for implementing an electronic security evaluator, according to an embodiment.

This disclosure relates generally to electronic information technology security evaluation and improvement. More specifically, the disclosure relates to an electronic security evaluator and graphical user interfaces for electronically evaluating and improving security for one or more software applications and associated hardware within an organization such as, but not limited to, a retail organization (e.g., a retailer).

A security score includes a weighted score representing a security posture for a software application. In an embodiment, the security score is a numerical value. In an embodiment, the weighted score can be selected so that all scores are provided within a particular numerical range. In an embodiment, the numerical value can have a value between 300 and 850. It will be appreciated that these numbers are intended as examples. The actual numerical range can vary beyond the stated values in accordance with the description in this specification. In an embodiment, the security score may serve as a facilitator for an owner (e.g., a development team, etc.) of the software application to improve the overall security health of the software application by, for example, following prioritized action instructions (e.g., a recommendation indicator).

In an embodiment, an overall range of security scores may be divided into sub-ranges to identify various characterizations of the security posture for the particular software application. For example, in an embodiment that includes a possible range of scores between 300 and 850, a score of 750-850 may indicate an excellent security health; a score of 650-749 may indicate an average security health; and a score of 300-649 may indicate a security health that needs improvement.

A software application includes, for example, any discrete software that may enable an organization to function. A software application can include a single, standalone application. In an embodiment, a software application can include a plurality of software applications that are integrated to accomplish a particular task. For example, in a retail organization, a software application may be used for the point-of-sale (POS) devices of the retail organization. The software application for the POS devices may be composed of a number of separate software applications. In an embodiment, the software application and the associated hardware may be reviewable in the electronic security evaluator.

An organization, such as a retailer or the like, may utilize a number of different software applications to function. Security of these software applications may be an area of focus for the organization. Breaches of an organization due to security vulnerabilities can lead to sensitive data being exposed or stolen. The threat of breaches is constant. Organizations are constantly seeking ways to evaluate security posture and improve the security health of software applications. One aspect of this is enabling the tracking and management of security health for the various software applications.

One aspect of improved security includes reviewing software applications to assess the security posture of the software applications. Regardless of whether a software application is considered to be relatively more secure or relatively more vulnerable, knowledge of the current state and ways to improve the current assessment are desirable.

A security evaluation can include, for example, an evaluation or assessment of a software application to determine how likely that software application may be a risk for a security incident.

FIG. 1 is a schematic diagram of a system 10 for implementing the electronic security evaluator systems and methods described in this specification, according to an embodiment. The system 10 can be used to provide a graphical user interface (GUI) to a user device (e.g., user device 15) so that the user can electronically track and manage security vulnerabilities for a software application or for a plurality of software applications for a unit or division of the organization, or the like.

The system 10 includes a server 25 in electronic communication with a plurality of user devices 15 via a network 20. The server 25 can make an electronic security evaluator 60 available to the user devices 15. The electronic security evaluator 60 can make a website or other GUI available to the user devices 15. An embodiment of the website or other GUI is shown and described in accordance with FIGS. 3A and 3B below. The electronic security evaluator 60 can make the website or other user interface of the electronic security evaluation system 10 as described in this specification available to the user devices 15 via the network 20. In an embodiment, the electronic security evaluator 60 can be configured to generate one or more messages to a user that includes the security data as discussed below. Such a report can, for example, automatically (e.g., every month, every two weeks, every week, etc.) provide an update on the overall security of one or more software applications in the retail organization.

It will be appreciated that the website or other GUI may be made available by one or more servers that are physically separate, but electronically connected, with the server 25, such as a distributed network of servers. Aspects of the server 25 can be the same as or similar to aspects of the server device 535 shown and described in accordance with FIG. 8 below.

In an embodiment, the network 20 may be representative of the Internet. In an embodiment, the network 20 can include a local area network (LAN), a wide area network (WAN), a wireless network, a cellular data network, suitable combinations thereof, or the like. Aspects of the network 20 can be the same as or similar to aspects of the network 540 as shown and described in accordance with FIG. 8 below.

Users can review a security posture and overall security health of one or more software applications within an organization (e.g., a retail organization) via the user devices 15.

Examples of the user devices 15 include, but are not limited to, a personal computer (PC), a laptop computer, a mobile device (e.g., a smartphone, a personal digital assistant (PDA), a tablet-style device, etc.), a wearable mobile device (e.g., a smart watch, a head wearable device, etc.), or the like. The user devices 15 generally include a display device and an input device. A GUI for the electronic security management system can be electronically displayed on the display of the user devices 15. Inputs regarding data associated with the one or more items in the electronic security management system can be electronically entered via the input devices of the user devices 15. Examples of the display devices for the user devices 15 include, but are not limited to, a monitor connected to a PC, a laptop screen, a mobile device screen, a tablet screen, a wearable mobile device screen, or the like. Examples of the input devices for the user devices 15 include, but are not limited to, a keyboard, a mouse, a trackball, a button, a voice command, a proximity sensor, a touch sensor, an ocular sensing device for determining an input based on eye movements (e.g., scrolling based on an eye movement), suitable combinations thereof, or the like. Aspects of the user devices 15 can be the same as or similar to aspects of the user devices 501 as shown and described in accordance with FIG. 8 below.

In an embodiment, the user devices 15 may be able to access the server 25 so long as the user is authenticated via the user device. In an embodiment, the user can be authenticated via a secure network. For example, if the user is logged into a secure network using, for example, the user's credentials as an employee (e.g., a single sign on (SSO)), the user can have access to the server 25 and correspondingly to a database 30. In an embodiment, the user can log in to the user device 15 (and accordingly the secure network) with a username and password and access data in the system 10 regardless of the user's location. For example, the user can be at home and have access to the system 10 as long as the user is logged in with her credentials and is connected to the secure network (e.g., via a virtual private network (VPN) or the like).

The server 25 is in electronic communication with database 30. The database 30 can include a variety of data related to the electronic tracking and management of security health of the software applications. In an embodiment, the database 30 can include one or more databases. For example the database 30 can include an application database 35, a findings database 40, a security testing database 45, a security certification database 50, and a security incidents database 55.

The application database 35 can include descriptive data about each of the software applications within an organization. In an embodiment, this data can include, for example, a name of the software application; an owner or responsible member of the organization for the software application; a security risk level of the application (e.g., high, medium, low); a relationship between a particular software application and the one or more other software applications or the hardware on which the software application is executed; an indicator as to whether the software application is in use, retired from use, or being phased out from use; or the like. In an embodiment, if a software application is retired or being phased out from use, the software application may be excluded from the application database 35. It will be appreciated that the data can be any descriptive data about the software application for the organization, and can include fewer or additional details from the example list above. In an embodiment, the application database 35 can include a data completeness score indicating whether a particular software application is missing data about the software application or whether the selected data is complete. In an embodiment, this completeness score may have no impact on the security score for the software application.

The application database 35 may include all or a subset of data from one or more external data sources 65 that are accessible to the server 25 via the network 20. In an embodiment, the application database 35 can be updated to include data from the one or more external data sources 65 on a periodic basis.

The findings database 40 can include data identifying one or more open and one or more closed security findings or vulnerabilities in the one or more software applications. The findings database 40 can include, for example, data indicating to which software application the finding corresponds; a risk of the finding if no action is taken; a planned date by which the finding or vulnerability should be fixed or resolved (e.g., closed); a description of the finding; an opening date associated with the finding; a person or team responsible for identifying the finding; a data source for the finding; or the like. In an embodiment, the findings database 40 can include a specific type for the finding. For example, the specific type can include, but is not limited to, SQL injection, cross-site scripting, or the like. In an embodiment, the security score for the application can be modified based on the specific type of finding, a count of a selected type of finding, or the like. It will be appreciated that the data can be any descriptive data about potential security vulnerability in software applications for the organization and can include fewer or additional details from the example list above.

The findings database 40 may include all or a subset of data from one or more external data sources 65 that are accessible to the server 25 via the network 20. In an embodiment, the findings database 40 can be updated to include data from the one or more external data sources 65 on a periodic basis.

The security testing database 45 can include data related to security testing for the software applications in the organization. For example, the security testing can include penetration testing or other security assessments such as, but not limited to, static application security testing (SAST), dynamic application security testing (DAST), or the like.

The security testing database 45 can include an entry for every software application in the organization, even if no security testing has been performed. In an embodiment, the security testing database 45 can include data for those software applications having had security testing, but no corresponding entry if the software application has not been security tested. In an embodiment, the data in the security testing database 45 can include, for example, a name of the software application corresponding to the security testing; a risk identified by the security testing; a type of the security testing; a status of the security testing; a date on which the last security test was executed; or the like. In an embodiment, the data in the security testing database 45 can be used to impact an overall security score. For example, if a software application has not been security tested, then the overall security score can be negatively impacted. In an embodiment, how recently the security testing for a software application was conducted can also impact the overall security score.

The security certification database 50 can include data related to whether a team member for a software application has been identified as being a security expert. The security certification database 50 can also include data about a level of the expertise for the security expert and tracking data associated with how involved the security expert is with various security initiatives (e.g., additional learning, etc.). In an embodiment, the security certification database 50 can include an entry regardless of whether a security expert has been identified. In an embodiment, the security certification database 50 can include an entry when the software application has an associated security expert, but no entry for software applications without an associated security expert. It will be appreciated that the data can include fewer or additional details from the example list above.

The security certification database 50 may include all or a subset of data from one or more external data sources 65 that are accessible to the server 25 via the network 20. In an embodiment, the security certification database 35 can be updated to include data from the one or more external data sources 65 on a periodic basis.

The security incidents database 55 can include data about whether a software application had a security incident within a past selected amount of time such as, but not limited to, 12 months. The security incidents database 55 can be a true or false indication, so that one or more security incidents results in a "true" setting for the software application. In an embodiment, the security incidents database 55 can store a count of the number of security incidents that occurred within the selected period of time. In an embodiment, the security incidents database 55 can also include a severity of the incident.

The security incident database 55 may include all or a subset of data from one or more external data sources 65 that are accessible to the server 25 via the network 20. In an embodiment, the security incident database 55 can be updated to include data from the one or more external data sources 65 on a periodic basis.

It will be appreciated that the above databases are examples. Additional databases can be included. One or more of the databases can be combined.

Figure 2:
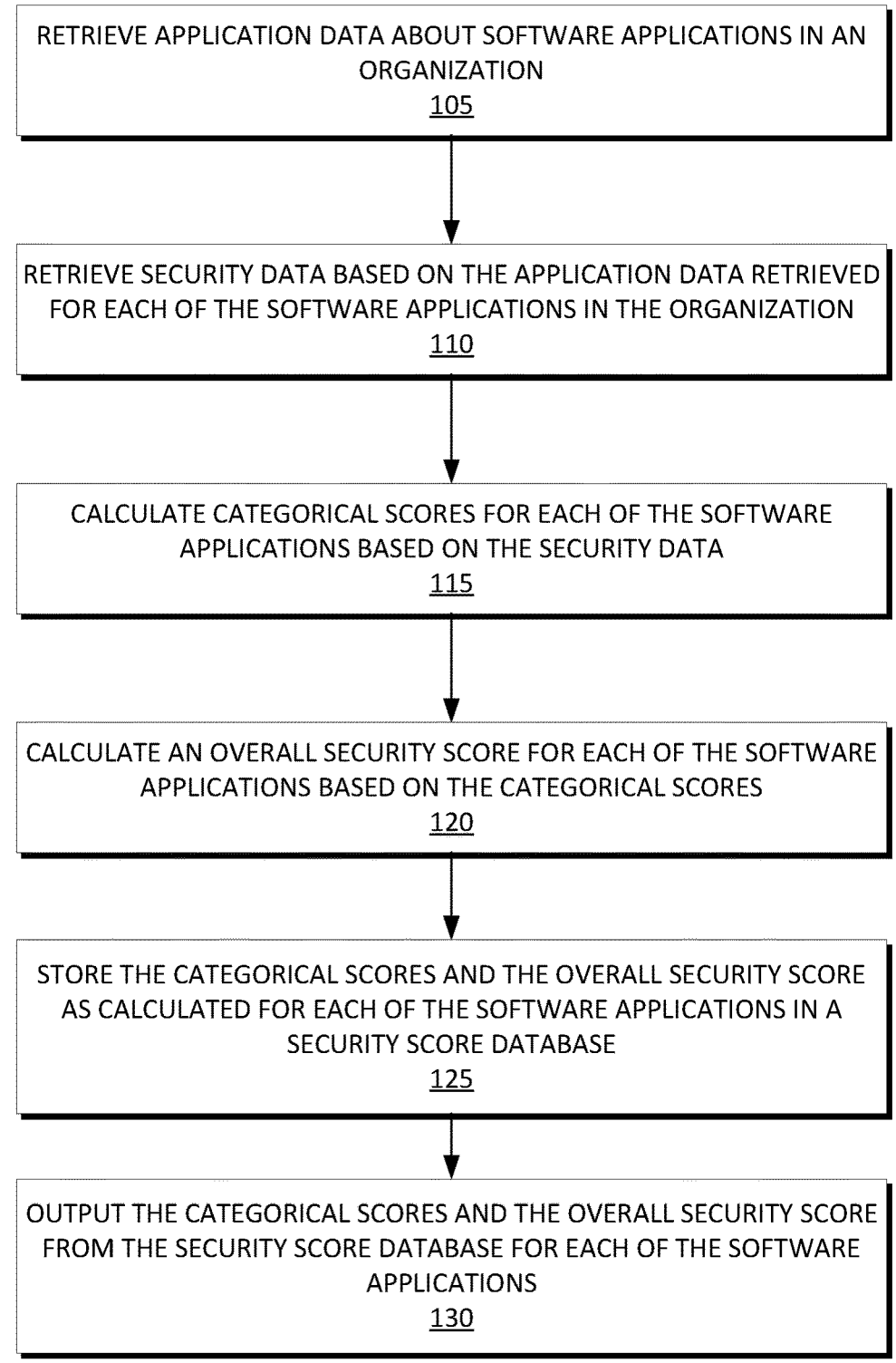
FIG. 2 is a flowchart of a method for evaluating one or more software applications in an organization for security vulnerabilities, according to an embodiment.

FIG. 2 is a flowchart of a method 100 for evaluating one or more software applications in an organization for security vulnerabilities, according to an embodiment.

At 105, an electronic security evaluator (e.g., the electronic security evaluator 60 in FIG. 1) on a server (e.g., the server 25) retrieves data about the one or more software applications in the organization. At 105, the electronic security evaluator 60 may retrieve the data about the one or more software applications in the organization from one or more data sources (e.g., data sources 65 in FIG. 1) via the network 20. The data retrieved may be in a different format than will be stored in the application database (e.g., the application database 35 in FIG. 1) or may include additional data than is utilized by the electronic security evaluator 60. Accordingly, at 105, the method 100 may also include selecting the appropriate data and formatting the data for storage in the application database 35.

At 110 the electronic security evaluator 60 on the server 25 retrieves security data for the software applications in the organization. At 110, the electronic security evaluator 60 may retrieve the security data about the one or more software application in the organization from the data sources 65 via the network 20. The security data retrieved may be in a different format than will be stored in the findings database (e.g., the findings database 40 in FIG. 1), the security testing database (e.g., the security testing database 45 in FIG. 1), the security certification database (e.g., the security certification database 50 in FIG. 1), the security incidents database (e.g., the security incidents database 55 in FIG. 1), or may include additional data than is utilized by the electronic security evaluator 60. Accordingly, at 110, the method 100 may also include selecting the appropriate data and formatting the data for storage in the databases 40-55 in a manner in which the different data is meaningful relative to each other.

At 115, the electronic security evaluator 60 calculates a categorical score for each of the software applications. The categorical score can be calculated for each of a plurality of categories.

In an embodiment, the organization can consider certain categories to be relevant to the security posture and overall security health level of the software application.

In an embodiment, the categories can include a score based on a number of findings and security vulnerabilities for the software application; based on whether the software application has been tested using security services (e.g., penetration testing or the like); whether a team responsible for the software application is implementing a culture focused on security; whether the software application has been the cause of a security incident; and whether the software application is considered to be utilizing secure code.

Accordingly, at 115, a score for each of the categories may be determined.

A first category can include a number or percentage of findings and security vulnerabilities that are closed on schedule. The corresponding data can be stored in the findings database 40. In an embodiment, this categorical score may be based on the percentage of findings closed on time within a group including all of the findings for a period of time. In an embodiment, the period of time may be, for example, 12 months. This determination may be based on identifying all findings within the findings database 40 that have a status "closed." A numerical score, a letter grade, or a combination thereof, can be applied according to the percentage. For example, more than 90% closed on time may result in an "A" letter grade and a point score between 149-165; 75%-90% may result in a "B" letter grade and a point score between 124-148; 60%-75% may result in a "C" letter grade and a point score between 99-123; 45%-60% may result in a "D" letter grade and a point score between 75-98; and less than 45% may result in an "F" letter grade and a point score between 0-74. It will be appreciated that these values (both the numeric values and the letter grades) are examples.

A second category can include a calculation about how significant the application of security services is being applied to the software application. The calculation for the usage of security services may be a multi-part calculation. For example, software applications that are identified as high risk applications and have been penetration tested within a recent period of time (e.g., 12 months) may be given an "A" letter grade and a maximum point score; if a software application has been partially tested within the recent period of time (e.g., 12 months), then a "B" letter grade may be assigned; a "C" letter grade may be assigned if the software application was ever penetration tested; a "D" letter grade may be assigned if; and an "F" letter grade if the software application has not been penetration tested. A corresponding number value can be assigned to each of the letter grades.

A third category can include whether the team responsible for the software application is implementing a culture focused on security. For example, the categorical score may be based on several considerations. A first of the considerations can include whether there is a security expert on the team (and what level the expert has achieved). A second of the considerations can include how many security-focused events the security expert has attended. In an embodiment, the data for this calculation may be maintained by the data security team and stored in the security certification database 50. The categorical score can include letter grades "A"-"F" and a corresponding numeric value.

A fourth category can include whether there have been any security incidents for the software application in a particular period of time. For example, if there have been no security incidents within the past 12 months, then the letter grade may be an "A." Conversely, if there have been any security incidents for the software application within the last 12 months, the letter grade may be an "F." A corresponding numeric value can be assigned to the letter grades "A" and "F." The security incidents data can be available in the security incidents database 55.

At 120, the electronic security evaluator 60 calculates an overall security score for the one or more software applications. The overall security score can be a numerical value that is based on the categorical scores determined at 115. For example, the score may be determined by the following equation:

Overall Security Score=ΣCategorical Scores

In an embodiment, an amount of the categorical score in each of the categories can be selected so that a weighting of the categories in the overall security score follows a selected breakdown. In an embodiment, the categorical scores can have a same numerical value when computed, and the overall security score can include a weighting multiplied by each of the categorical scores so that different categories have different impacts on the overall security score. This can, for example, identify an importance of the various categories within the overall security strategy for the organization. The weight percent may be selected based on the security strategy for the organization.

In an embodiment, multiple overall security scores can be calculated for each software application at 120. For example, the overall security score formula may change on a periodic basis (e.g., quarterly). In such an embodiment, the overall security score may be calculated according to the current formula and again calculated according to the formula that will be implemented in the future. As a result, each software application can include at least two overall security scores. It will be appreciated that additional overall security scores could be determined.

At 125 the categorical scores and the overall security scores for each of the software applications is stored by the electronic security evaluator 60 in the application database 35. At 130 the categorical scores and the overall security scores for each of the software applications can be retrieved from the database 130 and output to, for example, be displayed on a user device. Examples of the user interfaces are shown and described below.

The method 100 may be executed on a periodic basis. For example, the method 100 may be executed daily so that the categorical security scores and the overall security scores are maintained with up to date data. In an embodiment, the periodic basis can be longer than one day or shorter than one day. It will be appreciated that if the periodic basis is longer than one day the categorical security scores and the overall security stores may not reflect current data. Conversely, if the periodic basis is shorter than one day, the computational efforts required may be increased without providing a noticeable improvement in the reliability of the data.

Figure 3A:
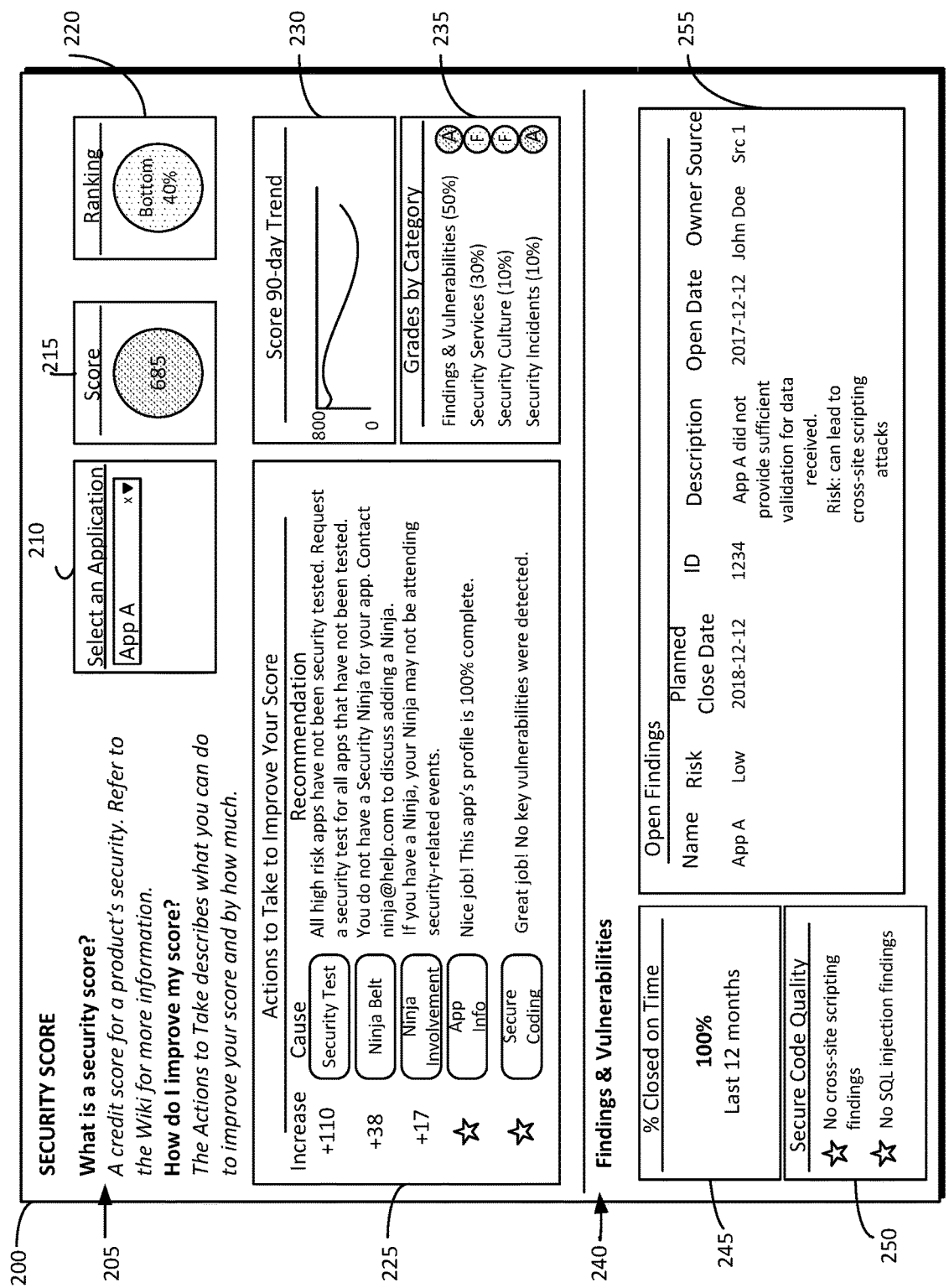
FIG. 3A is a schematic diagram of a first portion of a GUI for the electronic security evaluator, according to an embodiment.
Figure 3B:
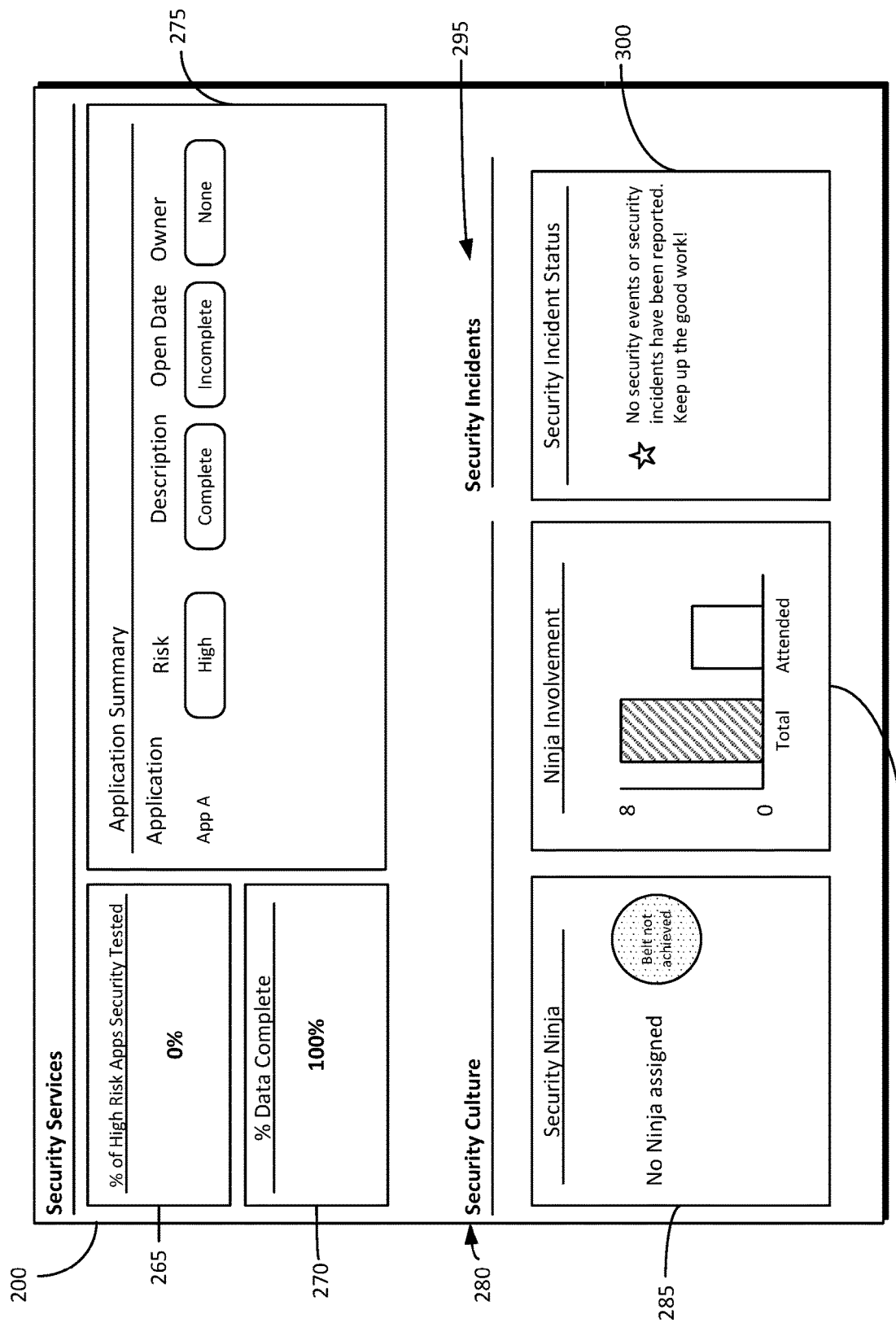
FIG. 3B is a schematic diagram of a second portion of the GUI of FIG. 3A for the electronic security evaluator, according to an embodiment.

FIGS. 3A and 3B are schematic diagrams of a GUI 200 for the electronic security management system, according to an embodiment. FIG. 3A includes a first portion of the GUI 200 and FIG. 3B includes a second portion of the GUI 200. It will be appreciated that the first portion and the second portion of the GUI 200 are portions of a single GUI and may be viewable by, for example, scrolling down from the first portion to the second portion, or up from the second portion to the first portion. It will be appreciated that a different amount of the GUI 200 may be shown according to a particular display for the user device on which the GUI 200 is being shown.

FIG. 3A includes an overall security score introduction 205. The overall security score introduction 205 includes data (e.g., text or the like) that explains about what the GUI 200 is showing. The overall security score introduction 205 can point a user to refer to various help data as well. An application input 210 enables the user to select one or more software applications for displaying the security posture and overall security health. In the illustrated embodiment, "Application A" has been selected. Another application can be added to the application input 210 by the user if the user would like to review the data for a plurality of software applications. In an embodiment, the user may be able to select display of a group of software applications according to, for example, its owner, its function, or the like. In such an embodiment, a security score may be determined for the entire group selected by averaging the overall security score for each of the software applications within that selected group. It will be appreciated that "Application A" can include a plurality of different software applications as well. The overall security score 215 displays the overall security score as determined in the method 100 and stored in the data database 30. A relative score indicator 220 is shown adjacent to the overall security score 215. In the illustrated embodiment, the "Application A" has an overall security score 215 of "685," which is identified as being in the "bottom 40%" relative to other software applications within the organization. The overall security score 215 and the relative score indicator 200 may be color-coded so that a user can visually see whether the overall security score 215 and the relative score indicator 200 are good or need improvement. Color coding is represented in the figures via a stippling effect. It will be appreciated that a number of colors and a particular score range or ranking can vary. Showing the ranking relative to other software applications can, for example, motivate the user to take actions to improve the overall security score to be viewed more positively within the organization.

Recommendations for ways to improve the overall security score are shown at recommendation indicator 225. The recommendation indicator 225 shows specific and prioritized (e.g., most impactful change is listed first, etc.) ways that a user can improve the overall security score of the software application, including an indication of how much the overall security score would improve if the user takes the corresponding action.

The GUI 200 includes an overall security score trend chart 230 to show the user how the overall security score has changed over time. In the illustrated embodiment, the score trend chart 230 is illustrated for a time period that includes the past 90 days. It will be appreciated that this is an example and that the time period can vary. In an embodiment, the user may be able to modify the time period. The GUI 200 also includes a breakdown 235 of the categorical scores that were determined and are resulting in the overall security score 215. To provide additional visibility and clarity, a weighting percentage associated with the various categories is shown in the breakdown 235. It will be appreciated that the number of categories can vary according to the number of categories that is being used to calculate the overall security score 215.

The GUI 200 includes a first category section 240. The first category section 240 corresponds to the findings and vulnerabilities category in the illustrated embodiment. The first category section 240 includes a first summary display 245 and a second summary display 250. The first summary display 245 shows an overall percentage of how many findings have been closed on time within a selected period of time (e.g., 12 months, etc.). The second summary display 250 includes a listing of findings that relate to a specific determination about a quality of the secure code in the software application. An open findings table 255 is displayed that enables the user to review what findings remain open for the software application. For a software application that includes one or more findings that have not been closed on time (e.g., were not closed prior to a scheduled close date), the user may be able to directly review the security finding in the GUI 200. This may, for example, enable the user to more promptly take action to resolve outstanding findings in an attempt to approve the overall security score 215 for the software application.

FIG. 3B shows the second portion of the GUI 200. In FIG. 3B, a second category section 260, a third category section 280, and a fourth category section 295 are illustrated. Similar to the first category section 240, the second category section 260, the third category section 280, and the fourth category section 295 correspond to the categories for which a categorical score was determined in the method 100 (FIG. 2).

In the illustrated embodiment, the second category section 260 corresponds to whether security services are being utilized for the selected software application. A pentest summary 265 indicates an overall percentage of high risk applications for which penetration testing has been performed. In the illustrated embodiment, 0% has been penetration tested. A data summary 270 indicates a completion percentage of the software application data in the software application database 35. If one or more details are missing, the overall percentage in the data summary 270 will decrease from 100%. An application summary table 275 is shown in the GUI 200 that includes additional data about the software application and its risk level, status of data in the software application database 35, status of penetration testing, and a last time of completing penetration testing are shown.

The third category section 280 corresponds to the security culture for the selected software application. For example, if the team has not appointed a security expert (e.g., a security ninja), then expert data display 285 will display that no security expert has been assigned, as is shown in the illustrated embodiment. If a security expert has been assigned, then a level of expertise achieved by the security expert will be shown in the expert data display 285. A tracker 290 displays how diligent that security expert (if one has been provided) is at attending events (e.g., lectures, etc.) that improve the knowledge level of the security expert.

The fourth category section 295 corresponds to whether security incidents have been reported for the software application. A status indicator 300 shows whether any security incidents have been recorded. The status indicator 300 may indicate for what period of time the data is relevant. For example, the organization can select a period of time of 12 months to review for past incidents. A specific number of incidents can be listed in the status indicator 300, according to an embodiment. In an embodiment, the status indicator 300 may indicate that at least one security incident occurred, but may not specify an actual number of security incidents within the selected time period.

Figure 4A:
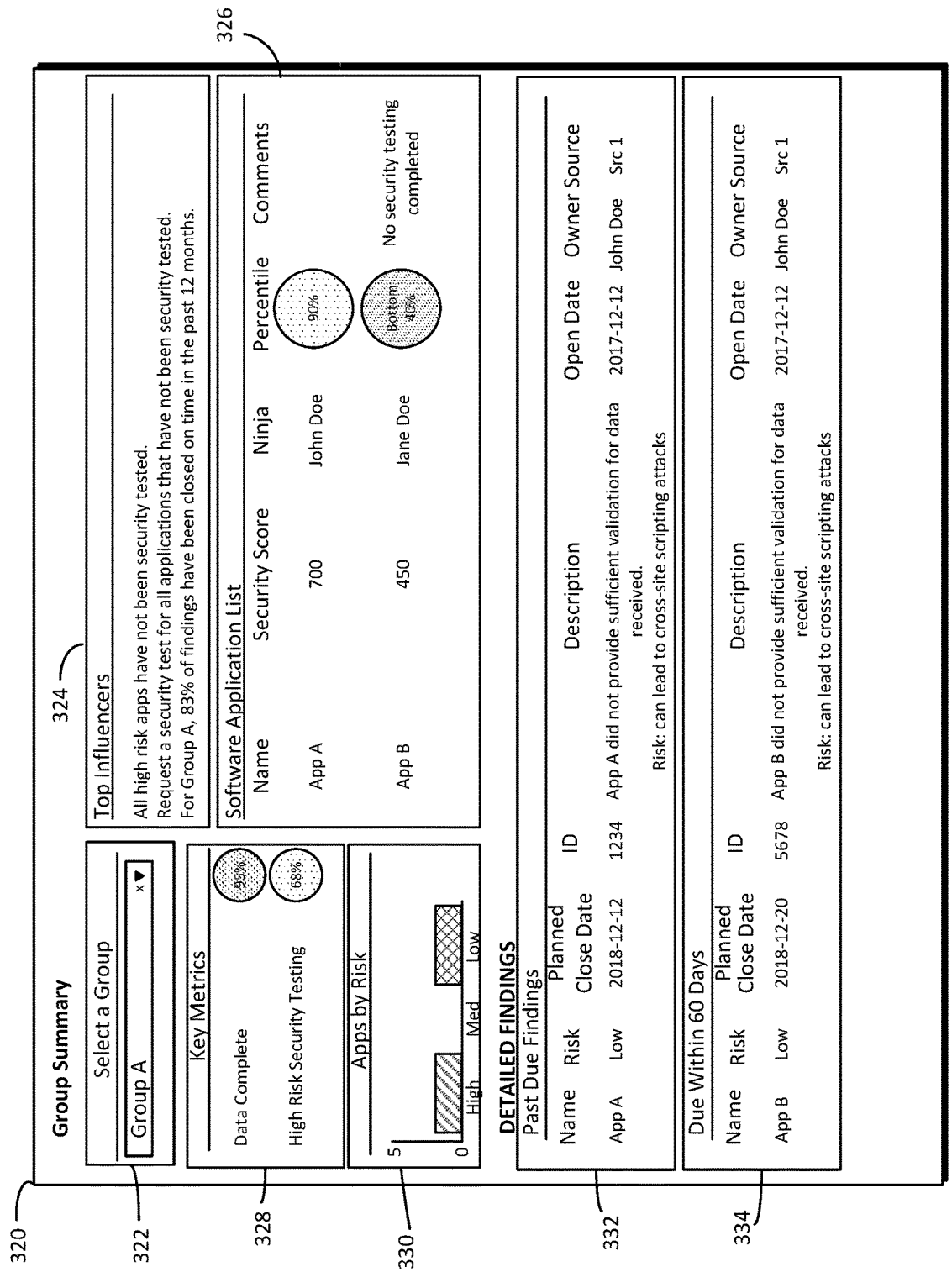
FIG. 4A is a schematic diagram of a first portion of a GUI for the electronic security evaluator showing a group of software applications, according to an embodiment.

FIGS. 4A and 4B are schematic diagrams of a GUI 320 for the electronic security evaluator showing a plurality of software applications, according to an embodiment. The first portion of the GUI 320 shown in FIG. 4A may generally be representative of an upper portion of the GUI 320. The second portion of the GUI 320 shown in FIG. 4B may generally be representative of a lower portion of the GUI 320 that is visible, for example, when the user scrolls on the display device.

The GUI 320 can summarize a plurality of software applications that are relevant to each other (e.g., a group). In an embodiment, the GUI 320 can be used to summarize a plurality of software applications ranging from 2 to at or about 30 applications.

The GUI 320 can have aspects that are the same as or similar to the GUI 200 in FIGS. 3A and 3B. Like reference numbers identify such aspects. In an embodiment, the GUI 320 may generally include similar information to the GUI 200 and may be a summary level view that includes multiple software applications or hardware. In an embodiment, the GUI 320 can be a summary for a set of software applications that collectively accomplish a single end function. For example, a point-of-sale software application may include a number of distinct software applications that collectively work together to accomplish point-of-sale functionality.

The GUI 320 includes a plurality of features for representing a security status of a plurality of software applications.

A group input 322 enables the user to select a group of software applications (e.g., two or more software applications) for displaying the security posture and overall security health of the group of software applications. The group input 322 can function similarly to the application input 210 (FIG. 3A), but can include different selections that are based on groupings of the software applications within the organization.

In the illustrated embodiment, "Group A" has been selected. Another group of software applications can be added via the group input 322 if the user would like to review the data for a plurality of groups of software applications.

In an embodiment, the software applications may be grouped according to, for example, owner, function, or the like. In an embodiment, an overall security score may be determined for the entire group selected by averaging the overall security score for each of the software applications within that selected group.

In the illustrated embodiment, the GUI 320 includes a top influencer indicator 324, a software application list 326, a key metric indicator 328, a risk chart 330, a past due findings indicator 332, an approaching due date findings indicator 334, a risk accepted findings indicator 336, and an application summary 338.

The top influencer indicator 324 can display a listing of information that is significant in determining the overall security score for the group (e.g., Group A). It will be appreciated that an amount of "top influencing" information displayed can be configured to highlight only a subset of the information that is relatively more significant. For example, the top influence indicator 324 can include a listing of the three most significant factors impacting a score. In an embodiment, this can include information relevant to security deficiencies (e.g., areas requiring attention) for the group. In an embodiment, this can include a listing of information that is relevant to both security deficiencies and security accomplishments (e.g., areas which have been completed). In an embodiment, the information selected for the top influencer indicator 324 can be identified based on, for example, a set of influencing information. That is, the influencing information can be a preset selection of influencing information, and based on whether a flag or other indicator is true or false, can be displayed or not displayed in the GUI 320.

The software application list 326 can include a listing of software applications or hardware that is included in the group. The software application list 326 can include, for example, a software application name (e.g., App A, etc.), an overall security score for the individual software application, a security ninja for the software application, a relative score indicator (e.g., the relative score indicator 220 in FIG. 3A), comments about the software application or hardware, or combinations thereof.

The key metric indicator 328 can show areas of key security compliance that impact the overall security score. In an embodiment, these can be areas that are based on the plurality of categorical scores. In an embodiment, these can be other areas that impact the overall security of the software applications and accordingly, the group.

The risk chart 330 can display a relative risk (e.g., high, low, medium, unrated, etc.) for the software applications within the group. For example, if the group includes 10 software applications, with 5 being identified as high risk and 5 being identified as low risk, the risk chart 330 may graphically show the relative risks of the software applications in the group. In an embodiment, the risk level of the software applications may be identified in the application database 35. In an embodiment, the risk level of the software applications may be selected based on the overall security score for each of the software applications.

The past due findings indicator 332 displays a listing of findings and information about the various findings for all of the software applications within the group that are past the planned closing date. The information may be selected for including in the past due findings indicator 332 based on a comparison of the current date and the planned closing date information for a finding as identified in, for example, the findings database 40 (FIG. 1).

The approaching due date findings indicator 334 displays a listing of findings that will be expected to be closed within an upcoming period of time for all of the software applications within the group. For example, the upcoming period of time may be 60 days, 90 days, or the like. The information may be selected for including in the approaching due date findings indicator 334 based on a comparison of the current date and the planned closing date information for a finding as identified in, for example, the findings database 40 (FIG. 1).

The risk accepted findings indicator 336 shows a listing of the findings which have been identified as being acceptable. Examples of such findings can include, for example, findings which have a relatively low security risk. The information may be selected for including in the risk accepted findings indicator 332 based on information for a finding as identified in, for example, the findings database 40 (FIG. 1).

The application summary 338 may display information about each of the applications as to whether the applications have been security tested. This information may be based on the information stored in the security testing database 45 (FIG. 1).

Figure 5:
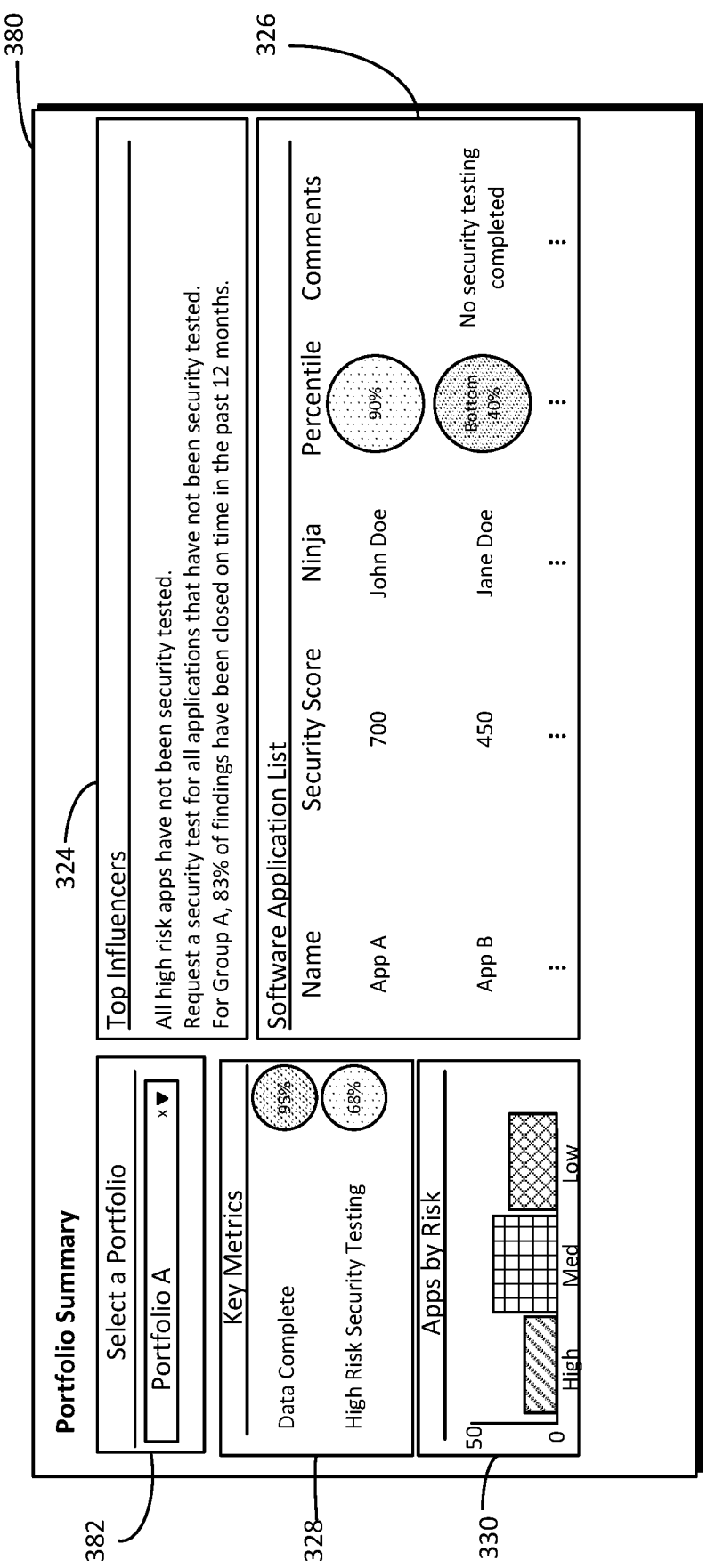
FIG. 5 is a schematic diagram of a GUI for the electronic security evaluator showing a plurality of applications, according to an embodiment.

FIG. 5 is a schematic diagram of a GUI 380 for the electronic security evaluator showing a plurality of applications, according to an embodiment. The GUI 380 can summarize a plurality of applications that are relevant to each other. In an embodiment, the GUI 380 can be used to summarize a plurality of applications ranging from at or about 30 applications to at or about 200-300 applications. It will be appreciated that the number of applications can vary beyond the stated range. For example, the GUI 380 can show a summary for more than 300 applications.

The GUI 380 can have aspects that are the same as or similar to the GUI 200 in FIGS. 3A and 3B and that are the same as or similar to the GUI 320 in FIG. 4. Like reference numbers identify such aspects. In an embodiment, the GUI 380 may generally include similar information to the GUI 320 and may be a summary level view that includes a relatively higher level view of multiple software applications (e.g., a portfolio level view). In an embodiment, the GUI 380 can be used to show all software applications within an area of an organization. For example, a director in charge of a particular area may be able to review a summary of all software applications that are under the director's ownership.

The GUI 380 includes a plurality of features for representing a security status of a plurality of software applications. A portfolio input 382 enables the user to select a software application portfolio that includes a group of software applications (e.g., two or more software applications) for displaying the security posture and overall security health of the portfolio of software applications. The portfolio input 382 can function similarly to the application input 210 (FIG. 3A) and the group input 322, but can include different selections that are based on portfolio level groupings of the software applications within the organization.

In the illustrated embodiment, "Portfolio A" has been selected. Another portfolio of software applications can be added via the portfolio input 382 if the user would like to review the data for a plurality of groups of software applications.

In an embodiment, the software applications may be grouped according to, for example, owner, function, or the like. In an embodiment, a security score may be determined for the entire group selected by averaging the overall security score for each of the software applications within that selected group.

Although not shown in FIG. 5, it will be appreciated that the GUI 380 can also include 332-338 (see FIGS. 4A, 4B).

Figure 6:
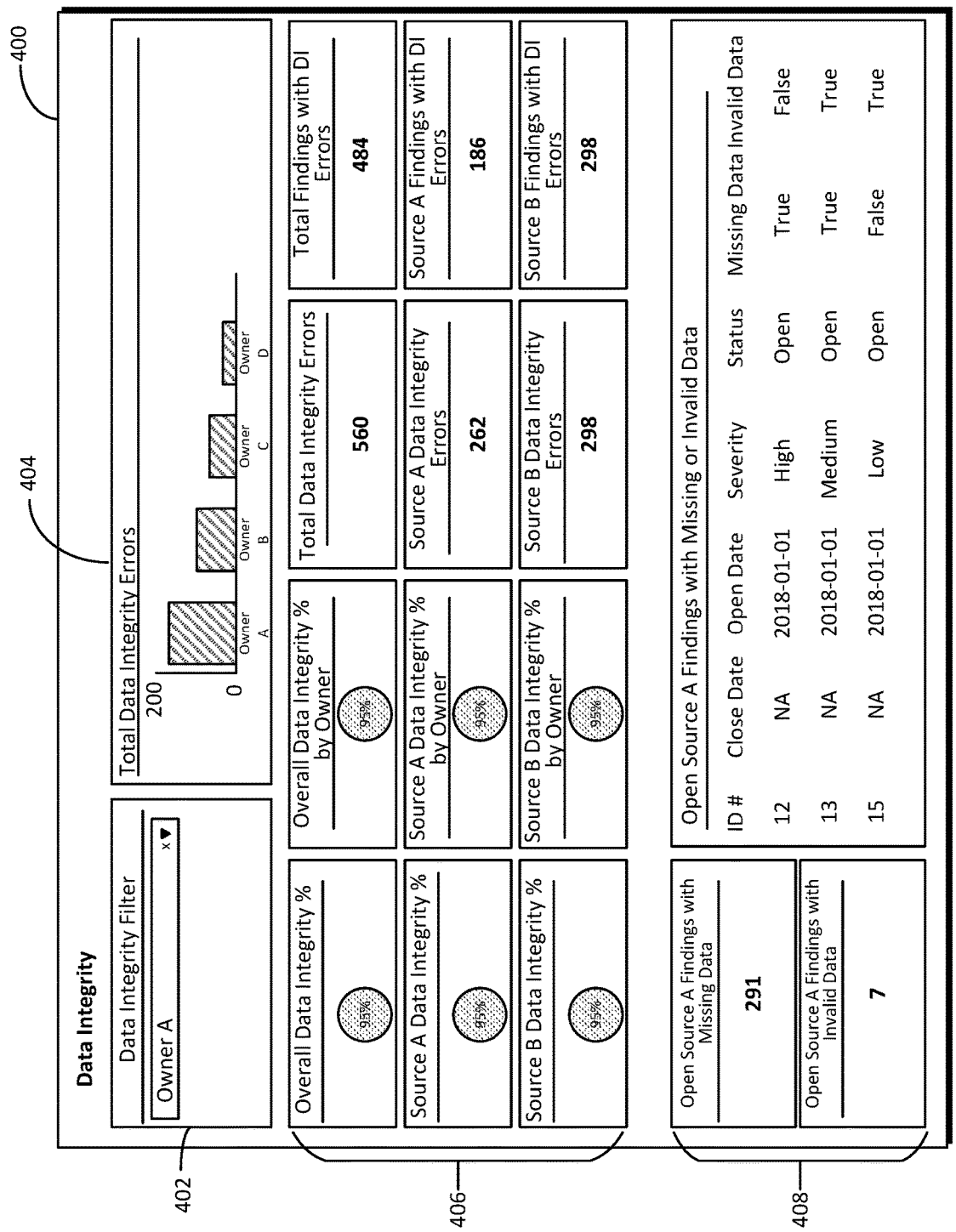
FIG. 6 is a schematic diagram of a data integrity GUI for the electronic security evaluator, according to an embodiment.

FIG. 6 is a schematic diagram of data integrity GUI 400 for the electronic security evaluator, according to an embodiment. The utilization of the electronic security evaluator may be determined based on how accurate and complete the data retrieved (e.g., from data sources 65) and stored in the database 30 is. As a result, a data integrity GUI 400 can be provided that can graphically show a user how complete and accurate the data within the database 30 is. Additionally, the user may be able to identify data sources which should be updated to improve the overall accuracy and completeness of the database 30.

In the GUI 400, a filter 402 can be used to select which data to be displayed in the GUI 400. In an embodiment, the data is grouped according to an owner of the data within the organization. This grouping may be selected, for example, to enable the owner of the data to review the data and ensure that appropriate fixes are made in corresponding data sources.

An error chart 404 and statistics indicator 406 provide a variety of statistics to the user about the data. The error chart 404 provides a graphical illustration of a total number of data errors needing attention, regardless of a data source for the data.

The statistics indicators 406 includes a variety of information for an overall data integrity, as well as for individual data sources (e.g., data source A, data source B, etc.). It will be appreciated that additional or fewer data sources can be included in the display, according to the utilization of various data sources within the organization. Examples of the statistics shown in the statistics indicator 406 include, but are not limited to, a total number of data integrity errors; a total number of findings in the findings database 40 with data integrity errors; a percentage of the entries including data integrity errors; or the like.

The GUI 400 also includes a data source detail indicator 408. The data source detail indicator 408 can show additional information about the data integrity errors for a corresponding data source. As a result, the user may be able to view specific areas in which the data requires attention in order to reduce the number of data integrity errors. For example, if a finding includes missing or invalid information in the findings database 40, the finding can be displayed in the data source detail indicator 408.

Figure 7:
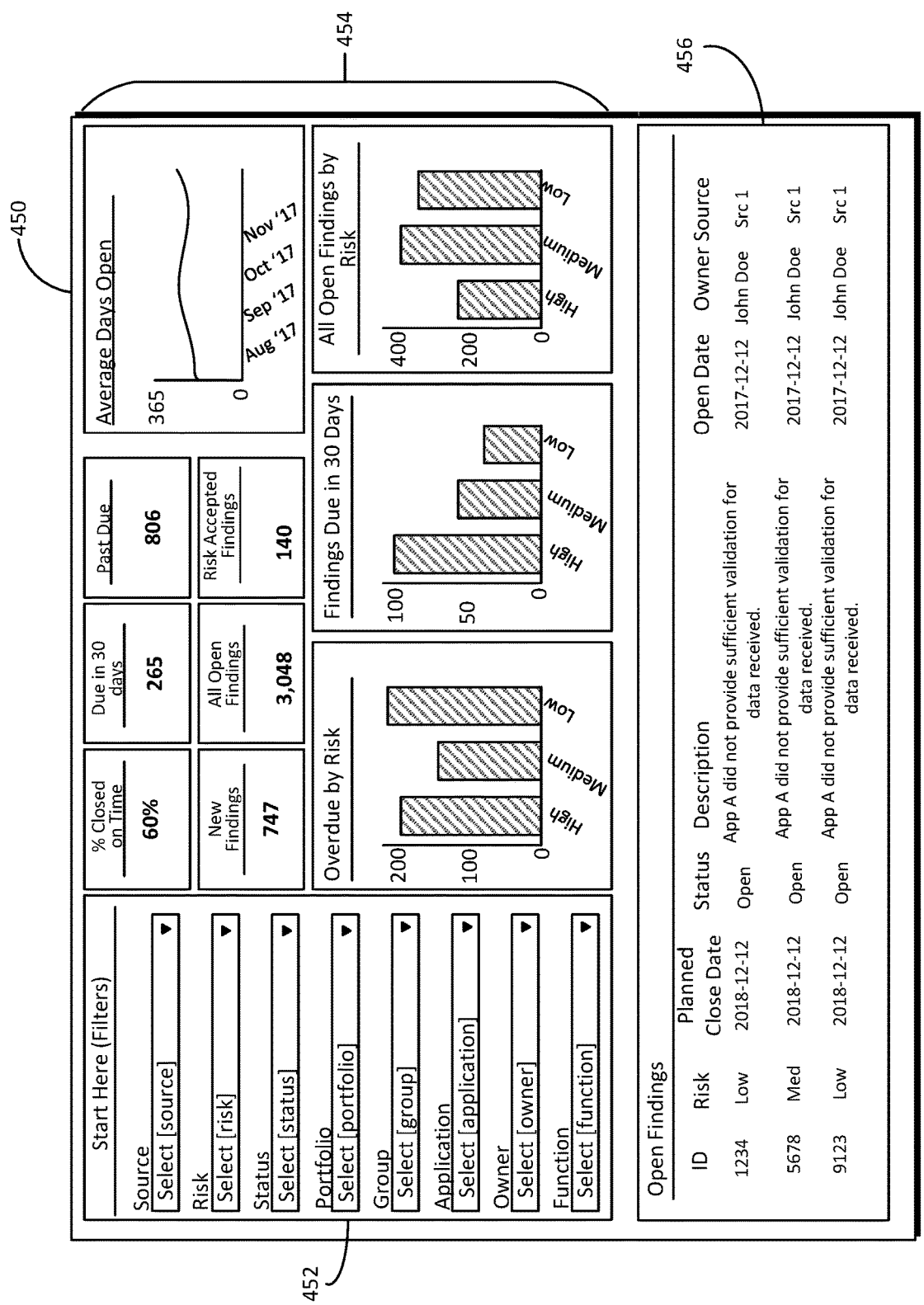
FIG. 7 is a schematic diagram of a findings GUI for the electronic security evaluator, according to an embodiment.

FIG. 7 is a schematic diagram of findings GUI 450 for the electronic security evaluator, according to an embodiment. The GUI 450 can include additional information and ways for a user to visualize the findings data that is stored in, for example, the findings database 40 (FIG. 1).

The GUI 450 can include a findings filter 452, findings statistics 454, and an open findings list 456. The findings filter 452 can used to select a variety of information to determine what findings and corresponding statistics are retrieved from the findings database 40. For example, the findings filter 452 can include a selection for a risk level, a status (e.g., open, closed, past due, accepted, etc.), a software application name, a group name, a portfolio name, an owner of the software application or findings, combinations thereof, or the like. It will be appreciated that the various filters can vary according to the information that is stored in the findings database 40.

Based on the selected filters, the findings statistics 454 are shown to the user. The findings statistics can include various statistics or charts to illustrate information that is useful for a user in assessing the security of one or more software applications. For example, the findings statistics 454 can include a percentage value of closed findings in the findings database 40 that are closed on time; a count of findings in the findings database that will be due within a given period of time (e.g., 30 days, 60 days, etc.); a count of total findings that are open and have passed the planned closing date; a total count of new findings opened within a recent period of time (e.g., 30 days, 60 days, etc.); a total count of open findings; a total count of findings which have been identified as risk accepted; a chart showing an average number of days findings were open over a recent period of time (e.g., previous six months, previous year, etc.); a chart showing a breakdown of findings that are overdue as grouped according to risk level (e.g., low, medium, high, etc.); a chart showing a breakdown of findings that will be due (e.g., in the next 30 days, etc.) as grouped according to risk level; a chart showing a breakdown of all open findings as grouped according to risk level; combinations thereof; or the like.

An open findings list 456 shows a user data corresponding to the various open findings in the findings database 40 based on the selected filters. In an embodiment, the user may be able to select a hyperlink or the like to download the listing of open findings (e.g., to a spreadsheet or the like).

Figure 8:
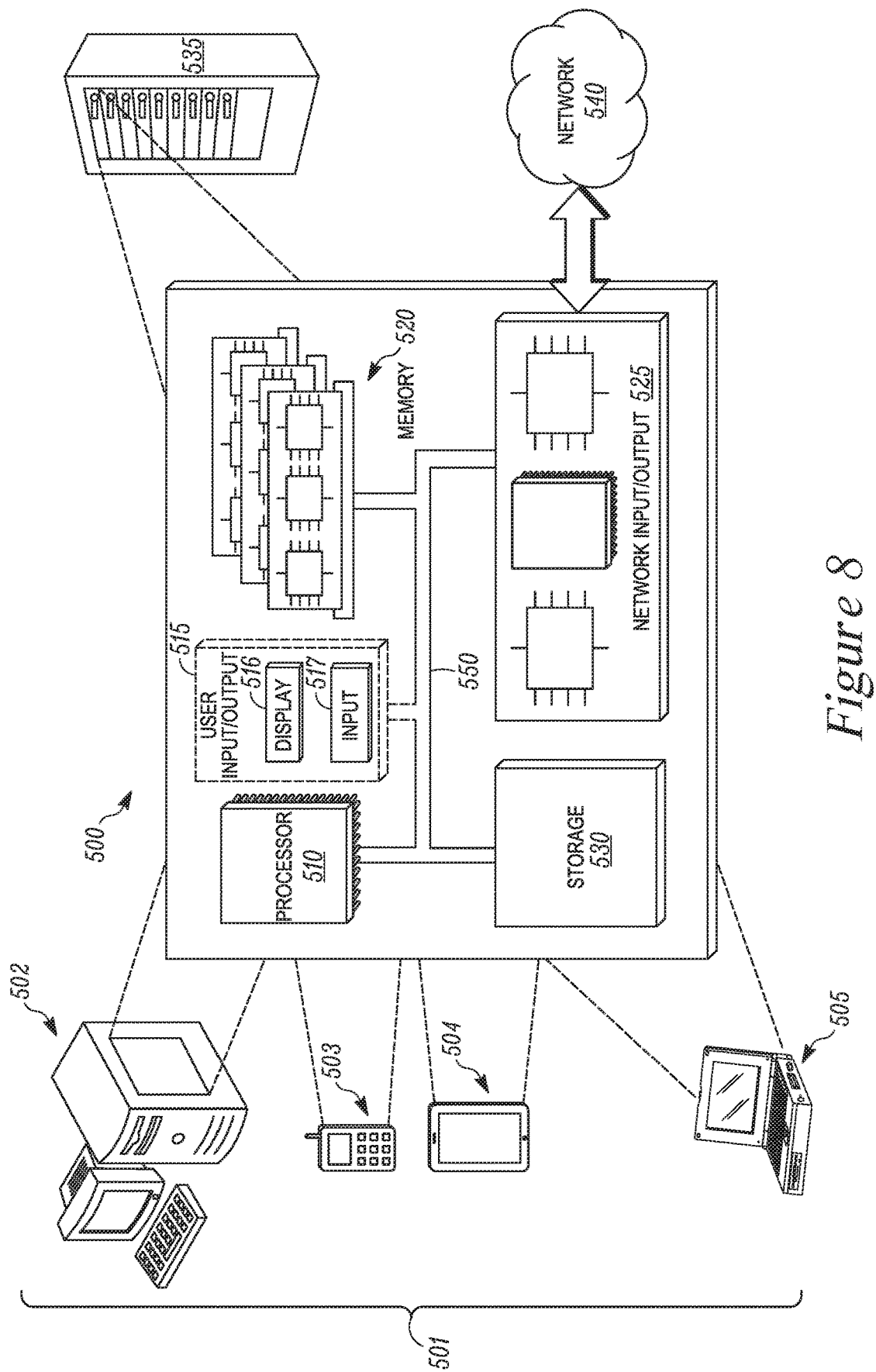
FIG. 8 is a schematic diagram of architecture for a computer device, according to an embodiment.

FIG. 8 is a schematic diagram of architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can be, for example, one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying data to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or input means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using Wi-Fi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A computer-implemented method to determine a security evaluation for one or more software applications in an organization, comprising:
   retrieving, by a server, application data about the one or more software applications via one or more databases;
   retrieving, by the server, security data for the one or more software applications via the one or more databases;
   calculating, by the server, a plurality of categorical scores for each of the one or more software applications based on the security data, wherein the plurality of categorical scores includes:
      a first category score that includes a number or percentage of security vulnerabilities that are closed on schedule for a particular software application of the one or more software applications,
      a second category score that includes a calculation directed to how significant an application of a security service is to the particular software application,
      a third category score based on evaluating whether a team responsible for the particular software application is implementing a culture focused on security, and
      a fourth category score based on a number of security incidents for the particular software application within a particular period of time;
   calculating, by the server, an overall security score for each of the one or more software applications based on combining the plurality of categorical scores as calculated;
   instructing, by the server, the plurality of categorical scores and the overall security score for each of the one or more software applications to be stored in an application database;
   outputting, from the server to a user device, the plurality of categorical scores and the overall security score for each of the one or more software applications in the application database;

instructing, by the server, display of the plurality of categorical scores and the overall security score on a display of a user device, wherein instructing the display of the categorical scores includes:
    displaying a first category section related to the first category score that shows the number or percentage of security vulnerabilities that have been closed on schedule within a selected time frame and a listing of security vulnerabilities that relate to a specific determination about a quality of a secure code in the particular software application,
    displaying a second category section related to the second category score that shows a risk level, a status of data, a status of penetration testing, and a last time of completing penetration testing for the particular software application,
    displaying a third category section related to the third category score that shows a security culture for the particular software application including whether a security expert has been assigned to the particular software application, what level of expertise has been achieved by the security expert, and how diligent the security expert is regarding improving their knowledge level, and
    displaying a fourth category section related to the fourth category score that shows a status indicator indicating whether any security incidents have been reported for the particular software application; and
displaying on the user device one or more recommendations for improving the overall security score for each of the one or more software applications based upon the plurality of categorical scores.

2. The computer-implemented method according to claim 1, wherein calculating the plurality of categorical scores for each of the one or more software applications includes determining a letter grade for a plurality of categories relating to a security posture of the one or more software applications.

3. The computer-implemented method according to claim 1, wherein determining the one or more recommendations for improving the overall security score for each of the one or more software applications is based on the letter grade for each of the plurality of categories.

4. The computer-implemented method according to claim 1, wherein calculating the overall security score for each of the one or more software applications includes adding the plurality of categorical scores for each of the one or more software applications, wherein a weight is assigned to each of the plurality of categorical scores that defines a significance of an impact of each of the plurality of categorical scores on the overall security score for each of the one or more software applications.

5. The computer-implemented method according to claim 1, wherein the method is performed on a recurring basis.

6. The computer-implemented method according to claim 1, wherein calculating, by the server, the overall security score for each of the one or more software applications includes calculating a plurality of overall security scores for each of the one or more software applications,
    determining a first of the plurality of overall security scores by adding the plurality of categorical scores for each of the one or more software applications, wherein a first weight is assigned to each of the plurality of categorical scores that defines a significance of an impact of each of the plurality of categorical scores on the first of the plurality of overall security scores for each of the one or more software applications, and
    determining a second of the plurality of overall security scores by adding the plurality of categorical scores for each of the one or more software applications, wherein a second weight is assigned to each of the plurality of categorical scores that defines a significance of an impact of each of the plurality of categorical scores on the second of the plurality of overall security scores for each of the one or more software applications.

7. The computer-implemented method according to claim 1, wherein retrieving the application data about the one or more software applications via the one or more databases and retrieving the security data for the one or more software applications via the one or more databases includes retrieving the application data about the one or more software applications and the security data from one or more external data sources that are electronically accessible via a network.

8. An electronic security evaluation system, comprising:
a server that includes one or more processors and one or more non-transitory tangible computer-readable media programed with program instructions which, when the program instructions are executed, causes the server to operate an electronic security evaluator that:
retrieves application data about one or more software applications via one or more databases;
retrieves security data for the one or more software applications via the one or more databases;
calculates a plurality of categorical scores for each of the one or more software applications based on the security data, wherein the plurality of categorical scores includes:
    a first category score that includes a number or percentage of security vulnerabilities that are closed on schedule for a particular software application of the one or more software applications,
    a second category score that includes a calculation directed to how significant an application of a security service is to the particular software application,
    a third category score based on evaluating whether a team responsible for the particular software application is implementing a culture focused on security, and
    a fourth category score based on a number of security incidents for the particular software application within a particular period of time;
calculates an overall security score for each of the one or more software applications based on combining the plurality of categorical scores as calculated;
instructs the plurality of categorical scores and the overall security score for each of the one or more software applications to be stored in an application database;
outputs the plurality of categorical scores and the overall security score for each of the one or more software applications in the application database, wherein the server provides instructions to a user device over a network to cause display of a graphical user interface (GUI) on the display, the GUI including display of the plurality of categorical scores and the overall security score for one or more of the one or more software applications, wherein the GUI on the display includes:
    a first category section related to the first category score that shows the number or percentage of security vulnerabilities that have been closed on schedule within a selected time frame and a listing of security vulnerabilities that relate to a specific determination about a quality of a secure code in the particular software application, a second category section related to the second category score that shows a risk level, a status of data, a status of penetration testing, and a last time of completing penetration testing for the particular software application, a third category section related to the third category score that shows a security culture for the particular software application including whether a security expert has been assigned to the particular software application, what level of expertise has been achieved by the security expert, and how diligent the security expert is regarding improving their knowledge level, a fourth category section related to the fourth category score that shows a status indicator indicating whether any security incidents have been reported for the particular software application, and one or more recommendations far improving the overall security score for the selected one of the one or more software applications based upon the displayed plurality of categorical scores.

9. The system according to claim 8, wherein the electronic security evaluation system calculates the plurality of categorical scores for each of the one or more software applications by determining a letter grade for a plurality of categories relating to security posture of the one or more software applications.

10. The system according to claim 8, wherein the one or more recommendations for improving the overall security score for each of the one or more software applications is based on the letter grade for each of the plurality of categories.

11. The system according to claim 10, wherein the electronic security evaluation system provides instructions to the user device over the network to cause display of the GUI further including display of the one or more recommendations for improving the overall security score for each of the one or more software applications.

12. A computer device for implementing display of a security evaluation for one or more software applications, wherein the computer device comprises:

one or more processors and one or more non-transitory tangible computer-readable media programmed with program instructions which, when the program instructions are executed, causes the computer device to display an electronic security evaluator interface, comprising:

inputs for completion by a user, the inputs identifying one or more software applications in an organization for which to display the electronic security evaluator interface, a plurality of categorical security scores for a selected one of the one or more software applications in the organization, when the inputs are received from the computer device identifying one of the one or more software applications, an overall security score calculated for the selected one of the one or more software applications based on combining the plurality of categorical scores for the selected one of the one or more software applications, wherein the electronic security evaluator interface is automatically updated and displays the overall security score and the plurality of categorical security scores for the selected one of the one or more software applications in the organization according to the inputs received, wherein the plurality of categorical security scores further includes:

a first category score that includes a number or percentage of security vulnerabilities that are closed on schedule for a particular software application of the one or more software applications, a second category score that includes a calculation directed to how significant an application of a security service is to the particular software application, a third category score based on evaluating whether a team responsible for the particular software application is implementing a culture focused on security, and a fourth category score based on a number of security incidents for the particular software application within a particular period of time, and wherein the security evaluator interface is further configured to display:

a first category section related to the first category score that shows the number or percentage of security vulnerabilities that have been closed on schedule within a selected time frame and a listing of security vulnerabilities that relate to a specific determination about a quality of a secure code in the particular software application, a second category section related to the second category score that shows a risk level, a status of data, a status of penetration testing, and a last time of completing penetration testing for the particular software application, a third category section related to the third category score that shows a security culture for the particular software application including whether a security expert has been assigned to the particular software application, what level of expertise has been achieved by the security expert, and how diligent the security expert is regarding improving their knowledge level, and a fourth category section related to the fourth category score that shows a status indicator indicating whether any security incidents have been reported for the particular software application and one or more recommendations far improving the overall security score for the selected one of the one or more software applications based upon the displayed plurality of categorical scores.

13. The electronic security evaluator interface according to claim 12, wherein the plurality of categorical scores for the selected one of the one or more software applications include a letter grade for each of a plurality of categories relating to security posture of the one or more software applications.

14. The electronic security evaluator interface according to claim 12, wherein the one or more recommendations are determined based on the letter grade for each of the plurality of categories relating to a security posture of the one or more software applications.

15. The electronic security evaluator interface according to claim 12, wherein the electronic security evaluator interface is automatically updated and displays a plurality of overall security scores for the selected one of the one or more software application in the organization according to the inputs received.

16. The electronic security evaluator interface according to claim 15, wherein one of the plurality of overall security scores is a beta overall security score which is provided to a user of the user device.

* * * * *